US011828997B2

United States Patent
Bran de León et al.

(10) Patent No.: US 11,828,997 B2
(45) Date of Patent: Nov. 28, 2023

(54) FAN-OUT ASSEMBLY FOR FIBER OPTIC CABLE

(71) Applicant: CommScope Technologies LLC, Hickory, NC (US)

(72) Inventors: Oscar Bran de León, Belle Plaine, MN (US); Thomas B. Marcouiller, Shakopee, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 84 days.

(21) Appl. No.: 17/350,092

(22) Filed: Jun. 17, 2021

(65) Prior Publication Data

US 2022/0019045 A1     Jan. 20, 2022

Related U.S. Application Data

(60) Provisional application No. 63/054,080, filed on Jul. 20, 2020.

(51) Int. Cl.
    G02B 6/44     (2006.01)
(52) U.S. Cl.
    CPC ......... *G02B 6/4472* (2013.01); *G02B 6/4479* (2013.01)
(58) Field of Classification Search
    CPC ....... G02B 6/44; G02B 6/4472; G02B 6/4479
    See application file for complete search history.

(56) References Cited

U.S. PATENT DOCUMENTS

| | | | | |
|---|---|---|---|---|
| 5,997,186 A | * | 12/1999 | Huynh | G02B 6/4446 |
| | | | | 385/99 |
| 6,389,214 B1 | * | 5/2002 | Smith | G02B 6/4472 |
| | | | | 385/86 |
| 9,575,277 B2 | * | 2/2017 | Bakatsias | G02B 6/4472 |
| 2008/0056661 A1 | * | 3/2008 | Mullaney | G02B 6/4475 |
| | | | | 385/135 |
| 2012/0230636 A1 | * | 9/2012 | Blockley | G02B 6/4472 |
| | | | | 385/59 |
| 2014/0241676 A1 | | 8/2014 | Smith | |
| 2015/0355429 A1 | * | 12/2015 | Villegas | H02G 15/115 |
| | | | | 385/101 |

(Continued)

OTHER PUBLICATIONS

"International Search Report and Written Opinion corresponding to International Application No. PCT/2021/041751 dated Nov. 4, 2021".

*Primary Examiner* — Tina M Wong
(74) *Attorney, Agent, or Firm* — Myers Bigel, P.A.

(57) ABSTRACT

An optical fan-out assembly includes: a fiber optic cable comprising a plurality of optical fibers and a surrounding jacket; a housing comprising first and second mating halves that mate to form a cavity, each of the first and second halves having opposite first and second ends and first and second lips adjacent respective first and second ends; the second half having a window, wherein the first lips create a seal with the cable jacket; a disk with a plurality of holes, a plurality of slots, and having a periphery, wherein a respective one of the plurality of slots extends between each hole and the periphery, the disk adjacent to and forming a seal with the second lips of the first and second halves; and a plurality of furcation tubes, each of the furcation tubes being inserted into a respective hole; wherein the optical fibers extend through the cavity, and each optical fiber is received in a respective furcation tube.

19 Claims, 3 Drawing Sheets

(56) References Cited

U.S. PATENT DOCUMENTS

| | | |
|---|---|---|
| 2015/0370029 A1 | 12/2015 | Petersen et al. |
| 2019/0187396 A1 | 6/2019 | Finnegan et al. |
| 2019/0285810 A1 | 9/2019 | Nielson et al. |
| 2020/0033535 A1 | 1/2020 | Petersen |

\* cited by examiner

FAN-OUT ASSEMBLY FOR FIBER OPTIC CABLE

RELATED APPLICATION

The present application claims priority from and the benefit of U.S. Provisional Patent Application No. 63/054,080, filed Jul. 20, 2020, the disclosure of which is hereby incorporated herein by reference in its entirety.

FIELD OF THE INVENTION

The present invention relates generally to power and signal distribution, and more particularly to distribution from hybrid cables.

BACKGROUND

Delivering power and data in wireless infrastructure typically involves the use of cable. In many instances, a single trunk cable can be used to supply multiple sectors, thereby eliminating multiple runs of cable. However, in order to use a single trunk cable, at some point the trunk cable must transition to jumper cables. For fiber optic cables, an enclosure may be used that transitions the multiple optical fibers of the trunk cable to individual optical fibers in the jumper cables. Typically this transition entails separating the optical fibers, removing any protective cladding or jacketing, and routing the individual optical fibers into furcation tubes or the like that exit the enclosure. The individual fibers are terminated with connectors that can then be attached to electronic equipment, such as remote radio heads or active antennas.

It may be desirable to provide enclosures that facilitate the assembly process.

SUMMARY

As a first aspect, embodiments of the invention are directed to an optical fan-out assembly. The assembly comprises: a fiber optic cable comprising a plurality of optical fibers and a surrounding jacket; a housing comprising first and second mating halves that mate to form a cavity, each of the first and second halves having opposite first and second ends and first and second lips adjacent respective first and second ends; the second half having a window, wherein the first lips create a seal with the cable jacket; a disk with a plurality of holes, a plurality of slots, and having a periphery, wherein a respective one of the plurality of slots extends between each hole and the periphery, the disk adjacent to and forming a seal with the second lips of the first and second halves; and a plurality of furcation tubes, each of the furcation tubes being inserted into a respective hole. The optical fibers extend through the cavity, and each optical fiber is received in a respective furcation tube.

As a second aspect, embodiments of the invention are directed to an optical fan-out assembly comprising: a fiber optic cable comprising a plurality of optical fibers and a surrounding jacket; a housing comprising first and second mating halves that mate to form a cavity, each of the first and second halves having opposite first and second ends and first and second lips adjacent respective first and second ends; the second half having a window, wherein the first lips create a seal with the cable jacket; a disk with a plurality of holes, a plurality of slots, and having a periphery, wherein a respective one of the plurality of slots extends between each hole and the periphery, the disk adjacent to and forming a seal with the second lips of the first and second halves; and a plurality of furcation tubes, each of the furcation tubes being inserted into a respective hole. The optical fibers extend through the cavity, and each optical fiber is received in a respective furcation tube. The assembly further comprises: a door that covers the window; and a cover that overlies the halves.

As a third aspect, embodiments of the invention are directed to a method of constructing a fiber optic fan-out assembly comprising the steps of:
(a) providing a fiber optic trunk cable comprising a plurality of optical fibers and a surrounding jacket;
(b) providing first and second halves of a housing, wherein the first and second halves mate to form a cavity, each of the first and second halves having opposite first and second ends and first and second lips adjacent respective first and second ends;
(c) providing a disk with a plurality of holes, a plurality of slots, and having a periphery, wherein a respective one of the plurality of slots extends between each hole and the periphery;
(d) exposing the optical fibers;
(e) inserting each of the optical fibers through a respective slot in the disk and into a hole in the disk;
(f) mating the halves of the housing to capture the cable jacket in the first lips and the disk with the optical fibers therein adjacent the second lips;
(g) routing the optical fibers into respective furcation tubes; and
(h) inserting furcation tubes into the holes.

DETAILED DESCRIPTION

Figure 1:
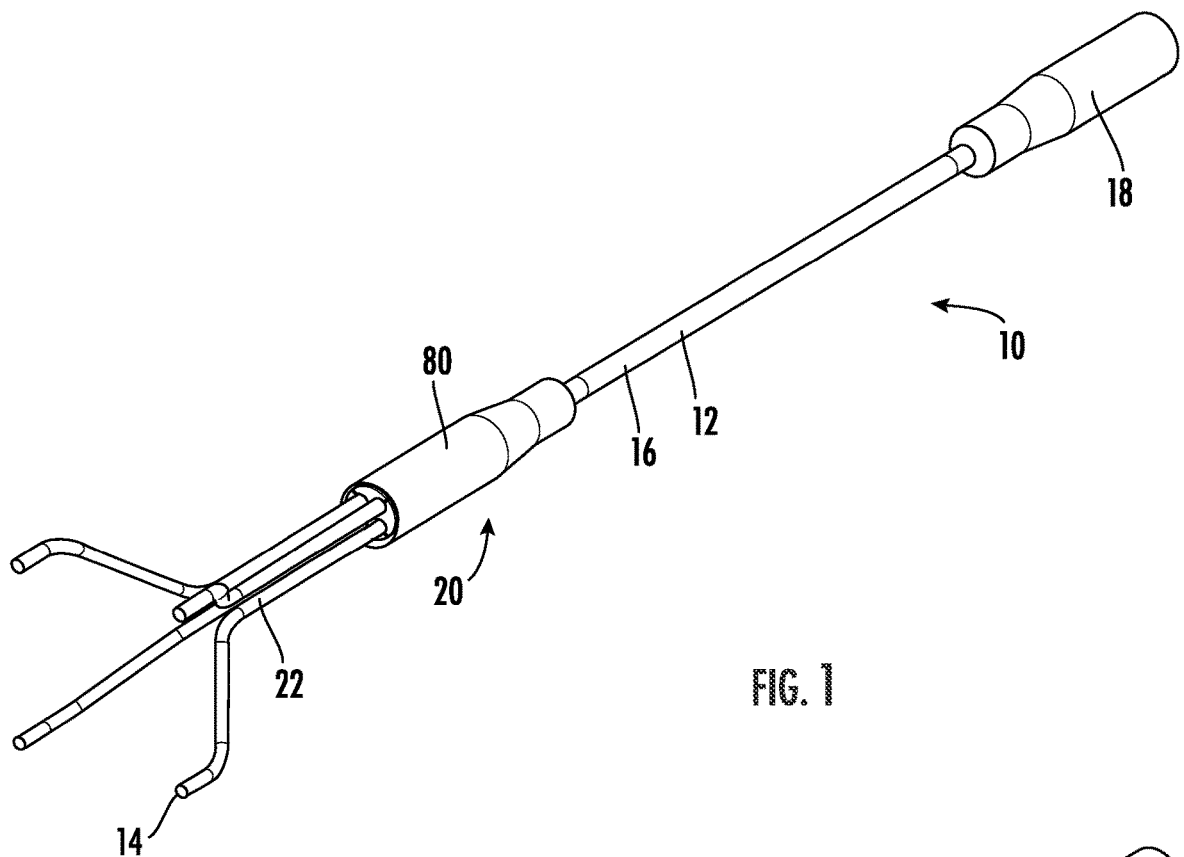
FIG. 1 is a perspective view of an optical fiber fan-out assembly according to embodiments of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Figure 2:
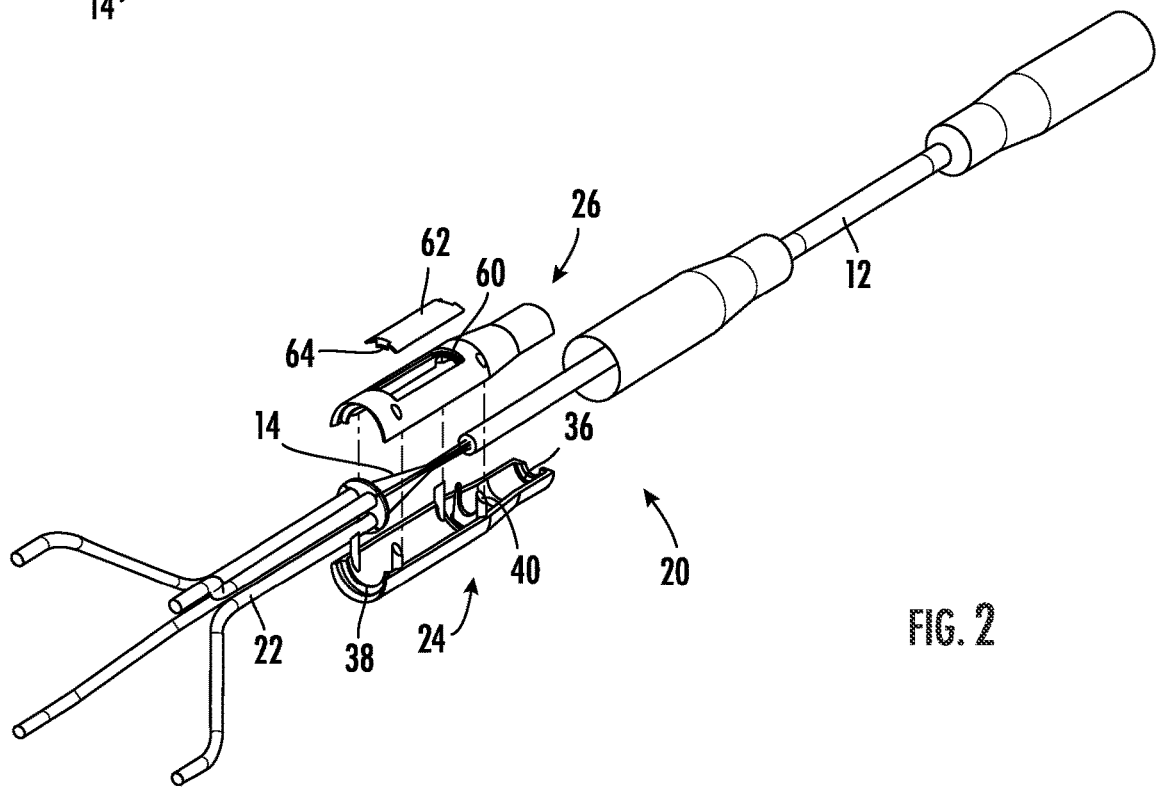
FIG. 2 is an exploded perspective view of the assembly of FIG. 1.

Referring now to the drawings, a fiber optic fan-out assembly, designated broadly at 10, is shown in FIGS. 1 and 2. The assembly 10 includes a fiber optic trunk cable 12 that includes a plurality of optical fibers 14 within a jacket 16. A connector 18 is attached at one end of the trunk cable 12. The trunk cable 12 is routed at each end into a respective housing 18, 20 (the housing 18 may be similar to the housing 20, such that the discussion below of the housing 20 may suffice for the housing 18 also).

Furcation tubes 22 exit the opposite end of the housing 20, each protecting one or more optical fibers that are contained therein. Connectors (not shown) are attached at the ends of the optical fibers 14 opposite the housing 20 for connection with equipment, such as an RRU or an active antenna. The cable 12 and furcation tubes 22 may be of conventional construction and need not be described in detail herein.

Figure 3:
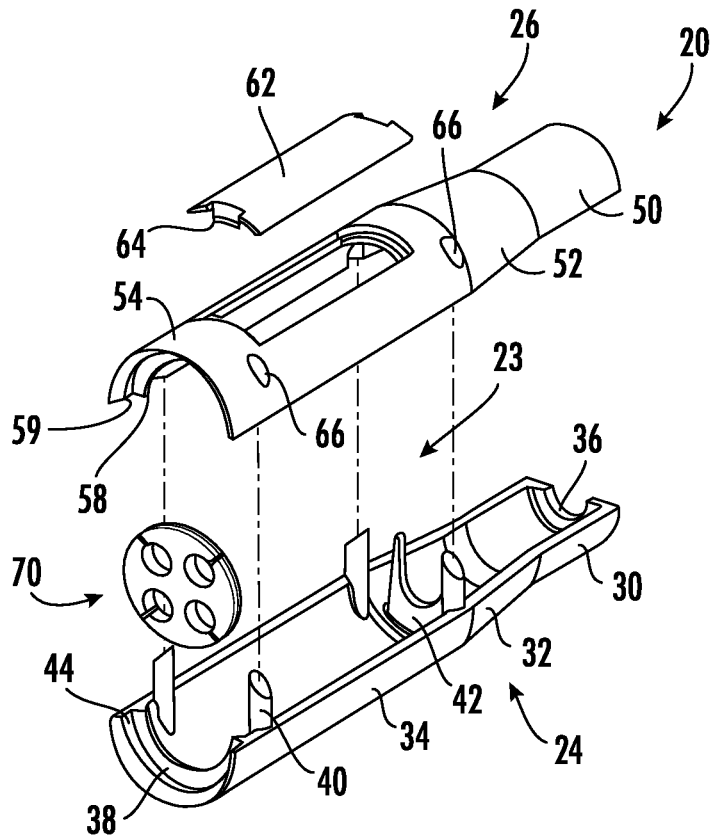
FIG. 3 is an exploded front perspective view of the fan-out housing and alignment disk of the assembly of FIG. 1.
Figure 4:
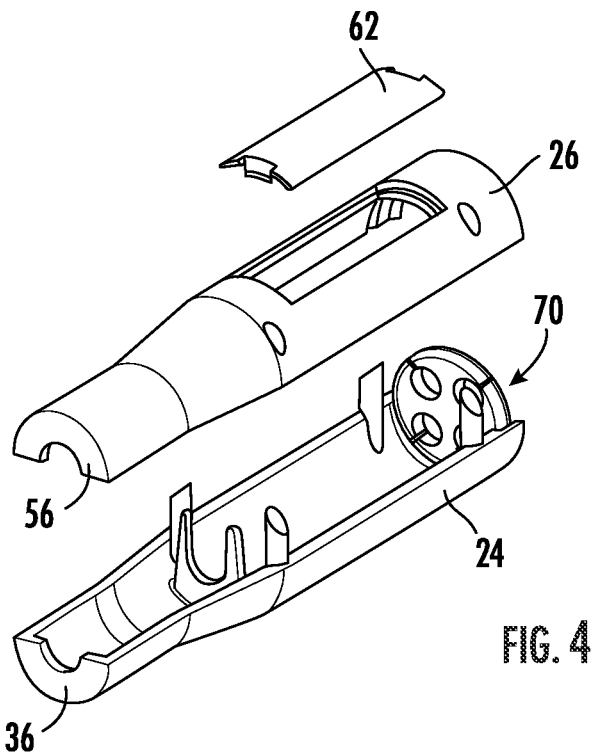
FIG. 4 is an exploded rear perspective view of the fan-out housing and alignment disk of the assembly of FIG. 3.

Referring now to FIGS. 2-4, the housing 20 is shown in greater detail therein. The housing 20 is of a "clamshell" variety, with two halves 24, 26 mating to form an enclosure with a cavity 23 therein. As used herein, the term "half" is intended to mean one of two pieces that are mated to form the housing 20, and is not intended to require that the two pieces be identical, or even of the same size. The halves 24, 26 are described in greater detail below.

The half 24 is generally semi-cylindrical, with a narrow neck 30, a transition section 32, and a wider body 34. A lip 36 is present near the free end of the neck 30. Another lip 38 is present near the free end of the body 34. Four posts 40 extend generally parallel to each other: two posts 40 are positioned near the intersection of the transition section 32, and two posts 40 are positioned near the lip 38. A U-shaped guide 42 is located near the intersection of the transition section 32 and the body 34. A groove 44 is positioned on the inner surface of the half 24 between the end thereof and the lip 38.

Referring still to FIGS. 2-4, the half 26 also has a neck 50, a transition section 52 and a body 54 that are sized to mate with corresponding sections of the half 24. The half 26 also includes lips 56, 58 that are sized and positioned to mate with, respectively, the lips 36, 38, and a groove 59. The half 26 also includes a window 60 in the body 34. A separate door 62 with latches 64 at either end is sized to cover the window 60. Holes 66 are positioned in the body 54 to receive the posts 40 from the half 24.

The halves 24, 26 may be formed of any material, but are typically formed of a polymeric material such as a thermoplastic polyolefin.

Figure 5:
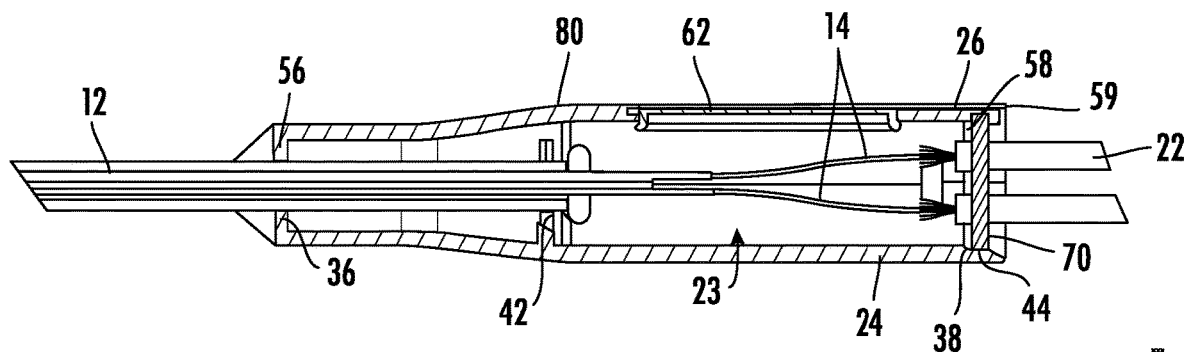
FIG. 5 is an enlarged, partial side section view of the assembly of FIG. 1.
Figure 6:
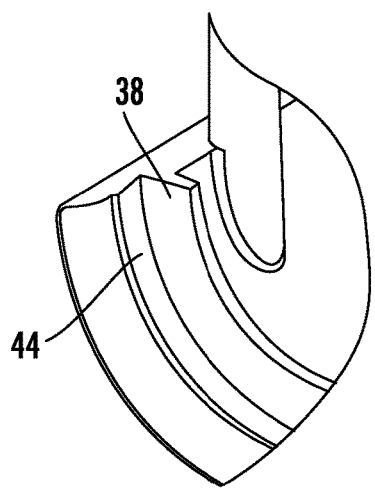
FIG. 6 is a greatly enlarged front perspective view of one end of the housing of the assembly of FIG. 1.
Figure 7:
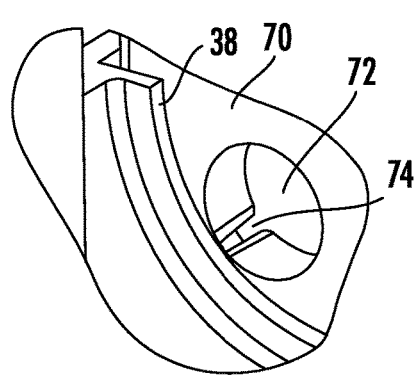
FIG. 7 is a greatly enlarged rear perspective view of the housing as in FIG. 6 with the alignment disk in place.
Figure 8:
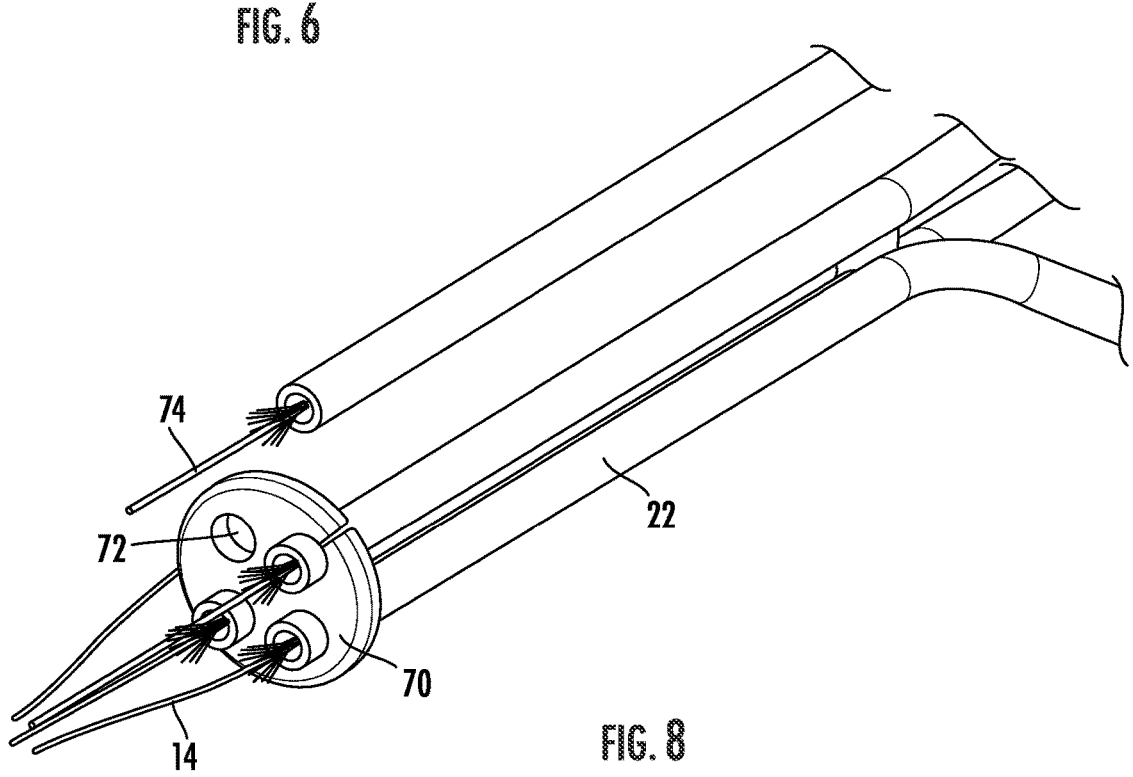
FIG. 8 is an enlarged perspective view of the furcation tubes and alignment disk of the assembly of FIG. 1.

A disk 70 is shown in FIGS. 3, 6 and 8. The disk 70 is round and includes four holes 72. Each hole 72 is connected with the periphery of the disk 70 via a radially-extending slot 74. The disk 70 is typically formed of a resilient material, such as rubber or plastic. The disk 70 is indicated to be round, but may take other forms, such as oval, rectangular, square, etc., Referring to FIGS. 2 and 5, a hollow cover 80 is shaped to circumferentially overlie the mated halves 24, 26 and a portion of the cable jacket 16. In some embodiments, the cover 80 is formed of a heat-shrinkable material.

Construction of the assembly 10 proceeds in the following manner. The cover 80 is slipped onto the cable 12. The jacket 16 of the cable 12 is stripped to a desired length, and the optical fibers 14 are separated and exposed (e.g., cladding or jacketing may be removed to expose the fiber). Each of the fibers 14 is then routed into a respective furcation tube 22. An exposed portion of each fiber 14 is slipped through a respective slot 74 into the corresponding hole 72 in the disk 70. Each of the furcation tubes 22 is inserted into the hole 72 in which its optical fiber resides.

Once all of the furcation tubes 22 are in place in the disk 70, the disk 70 is positioned in the groove 44 of the half 24, with the cable 12 resting in the guide 42. In this position, the exposed portions of the optical fibers 14 are located within the cavity 23 between the guide 42 and the lip 38. The half 26 is then mated to the half 24, with the posts 40 being inserted into the holes 66. Such mating aligns the lip 36 with the lip 56, and the lip 38 with the lip 58.

Notably, the mating of the lips 36, 56, 38, 58 forms watertight seals on each end of the housing 20. More specifically, the lips 36, 56 form a seal with the jacket 16 of the cable 12 and with each other. The lips 38, 58 form a seal with each other, and abut the inner surface of the disk 70. As such, the lips 38, 58 are positioned between the cavity 23 of the housing 20 and the slots 74 in the disk 70 and therefore provide a watertight seal between the cavity 23 and the slots 74.

Those of skill in this art will appreciate that this sequence of assembly steps may vary. For example, the optical fibers 14 may be routed into the furcation tubes 22, and the furcation tubes 22 installed in the holes 72, after the disk 70 is captured in the mating halves 24, 26. Other sequences of these steps may also be suitable to produce a subassembly that includes the cable 12, the housing 20 and the furcation tubes 22.

Once the halves 24, 26 are mated, epoxy or some other protective material can be introduced into the cavity 23 of the housing 20 through the window 60. The seals formed by (a) the lips 36, 56 and the cable 12 and (b) the lips 38, 58 and the disk 70 may prevent leakage of the epoxy through the ends of the housing 20. The door 62 is then installed in the half 26 to cover the window 60, and the cover 80 is slid over the mated halves 24, 26 to maintain them in a mated condition. In some embodiments, the cover 80 is a heat-shrinkable material, such that the application of heat after the cover 80 is in place causes it to shrink and tightly hold the halves 24, 26 together.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An optical fan-out assembly, comprising:
   a fiber optic cable comprising a plurality of optical fibers and a surrounding jacket;
   a polymeric housing comprising first and second mating halves that mate to form a cavity, each of the first and second halves having opposite first and second ends and first and second lips adjacent respective first and second ends; the second half having a window, wherein the first lips create a watertight seal with the cable jacket;
   a disk with a plurality of holes, a plurality of slots, and having a periphery, wherein a respective one of the plurality of slots extends radially outwardly between each hole and the periphery of the disk, the disk adjacent to and forming a watertight seal with the second lips of the first and second halves;
   a plurality of furcation tubes, each of the furcation tubes being inserted into a respective hole;
   wherein the optical fibers extend through the cavity, and each optical fiber is received in a respective furcation tube.

2. The assembly defined in claim 1, wherein each of the halves includes a groove adjacent the second lip, and wherein the disk is received within the grooves.

3. The assembly defined in claim 1, further comprising epoxy within the cavity.

4. The assembly defined in claim 1, further comprising a door that covers the window.

5. The assembly defined in claim 4, further comprising a cover that overlies the halves.

6. The assembly defined in claim 1, wherein the cover comprises a heat-shrinkable material.

7. The assembly defined in claim 1, wherein each of the first and second halves includes press-fit features.

8. An optical fan-out assembly, comprising:
   a fiber optic cable comprising a plurality of optical fibers and a surrounding jacket;
   a housing comprising first and second mating halves that mate to form a cavity, each of the first and second halves having opposite first and second ends and first and second lips adjacent respective first and second ends; the second half having a window, wherein the first lips create a watertight seal with the cable jacket;
   a disk with a plurality of holes, a plurality of slots, and having a periphery, wherein a respective one of the plurality of slots extends radially outwardly between each hole and the periphery of the disk, the disk adjacent to and forming a watertight seal with the second lips of the first and second halves;
   a plurality of furcation tubes, each of the furcation tubes being inserted into a respective hole;
   wherein the optical fibers extend through the cavity, and each optical fiber is received in a respective furcation tube;
   further comprising a door that covers the window; and
   a cover that overlies the halves.

9. The assembly defined in claim 8, wherein each of the halves includes a groove adjacent the second lip, and wherein the disk is received within the grooves.

10. The assembly defined in claim 8, further comprising epoxy within the cavity.

11. The assembly defined in claim 8, wherein the cover comprises a heat-shrinkable material.

12. The assembly defined in claim 8, wherein each of the first and second halves includes press-fit features.

13. A method of constructing a fiber optic fan-out assembly, comprising the steps of:
    (a) providing a fiber optic trunk cable comprising a plurality of optical fibers and a surrounding jacket;
    (b) providing first and second halves of a housing, wherein the first and second halves mate to form a cavity, each of the first and second halves having opposite first and second ends and first and second lips adjacent respective first and second ends;
    (c) providing a disk with a plurality of holes, a plurality of slots, and having a periphery, wherein a respective one of the plurality of slots extends radially outwardly between each hole and the periphery of the disk;
    (d) exposing the optical fibers;
    (e) inserting an exposed portion of each of the optical fibers through a respective slot in the disk and into a hole in the disk;
    (f) mating the halves of the housing to capture the cable jacket in the first lips and the disk with the optical fibers therein adjacent the second lips, thereby forming a watertight seal;
    (g) routing the optical fibers into respective furcation tubes; and
    (h) inserting furcation tubes into the holes.

14. The method defined in claim 13, wherein each of the halves includes a groove adjacent the second lip, and wherein the disk is received within the grooves.

15. The method defined in claim 13, further comprising introducing epoxy into the cavity through the window.

16. The method defined in claim 13, further comprising installing a door that covers the window.

17. The method defined in claim 13, further comprising applying a cover that overlies the halves.

18. The method defined in claim 17, wherein the cover comprises a heat-shrinkable material, and wherein the applying step comprises applying heat to the cover to shrink onto the housing.

19. The method defined in claim 13, wherein each of the first and second halves includes press-fit features, and wherein the mating step comprises press-fitting the features of the first half onto the features of the second half.

* * * * *